United States Patent
Custodero et al.

(10) Patent No.: US 6,770,367 B1
(45) Date of Patent: Aug. 3, 2004

(54) CARBON BLACK COATED WITH AN ALUMINOUS LAYER AND PROCESS FOR OBTAINING SAME

(75) Inventors: Emmanuel Custodero, Chamalieres (FR); Laure Simonot, Clermont-Ferrand (FR); Jean-Claude Tardivat, Clermont-Ferrand (FR)

(73) Assignee: Compagnie Générale des Etablissements Michelin - Michelin & Cie (FR)

( * ) Notice: Subject to any disclaimer, the term of this patent is extended or adjusted under 35 U.S.C. 154(b) by 116 days.

(21) Appl. No.: 09/583,655

(22) Filed: May 30, 2000

Related U.S. Application Data

(63) Continuation of application No. PCT/EP98/07678, filed on Nov. 27, 1998.

(30) Foreign Application Priority Data

Nov. 28, 1997 (FR) .............................................. 97 15129

(51) Int. Cl.[7] ................................................. B32B 9/00
(52) U.S. Cl. ...................... 428/403; 428/402; 428/408; 423/449.1; 423/449.2; 423/460; 427/215; 427/226; 427/372.2
(58) Field of Search ................................. 428/408, 403, 428/402; 423/445 R, 449.1, 449.2, 460; 427/212, 226, 372.2, 215

(56) References Cited

U.S. PATENT DOCUMENTS

| | | | |
|---|---|---|---|
| 3,025,173 A | | 3/1962 | Bernstein |
| 4,590,039 A | * | 5/1986 | Cheng |
| 5,145,719 A | | 9/1992 | Towata et al. |

| | | | |
|---|---|---|---|
| 6,090,880 A | * | 7/2000 | Zimmer et al. |

FOREIGN PATENT DOCUMENTS

| | | |
|---|---|---|
| DE | 3502494 A | 8/1985 |
| DE | 4116523 A | 11/1991 |
| EP | 0581651 A | 2/1994 |
| EP | 0736491 A | 10/1996 |
| JP | 09272816 | 10/1997 |

OTHER PUBLICATIONS

English Abstract, DE 3502494, Aug. 8, 1985.*
Chemical Abstracts, vol. 127, No. 21, Nov. 24, 1997, Columbus, Ohio, US; abstract No. 294679, Kurozumi Tadatoshi et al.: "Carbon black with surface modified with oxides" XP 002095828.
Database WPI, Section Ch, Week 9231, Derwent publications Ltd., London, GB; Class A60, AN 92-256418, XP 002095980.
U.S. application Ser. No. 09/580,279, of Custodero et al., filed May 30, 2000, "Rubber composition for tires, reinforced with a carbon black coated with an aluminous layer and process for obtaining the same."

* cited by examiner

Primary Examiner—Deborah Jones
Assistant Examiner—Wendy Boss
(74) Attorney, Agent, or Firm—Baker Botts L.L.P.

(57) ABSTRACT

The invention provides a process for preparing a modified carbon black with an adhering layer of aluminum oxide and/or hydroxide. This process involves (a) impregnating a starting carbon black with a colloidal suspension formed by hydrolysis of a solution of aluminum alkoxide in an alcoholic solvent, (b) removing the alcoholic solvent by evaporation, and (c) heat-treating the black thus impregnated so as to transform the aluminuous layer present at its surface into an adhering layer of aluminum oxide and/or hydroxide. The modified carbon black prepared by the process is also provided.

15 Claims, 2 Drawing Sheets

CARBON BLACK COATED WITH AN ALUMINOUS LAYER AND PROCESS FOR OBTAINING SAME

The present application is a continuation of PCT/EP98/07678, filed Nov. 27, 1998, now WO 99/28391.

BACKGROUND OF INVENTION

The present invention relates to reinforcing fillers capable of reinforcing diene rubber compositions which can be used for the manufacture of tires or semi-finished products for tires, in particular treads for these tires. It relates more particularly to novel carbon blacks having a modified surface, and to processes for obtaining the same.

In order to reduce fuel consumption and the pollution emitted by motor vehicles, major attempts have been made by tire designers to obtain tires having all of the following characteristics: very low rolling resistance, improved grip both on dry ground and on wet or snow-covered ground, and very good wear resistance.

Numerous solutions have thus been proposed to lower the rolling resistance and to improve the grip of tires, but these have generally resulted in a very great decline in the wear resistance.

It is well known that the incorporation of conventional white fillers, such as silica ($SiO_2$), alumina ($Al_2O_3$), titanium oxide ($TiO_2$), chalk, talc, clays such as bentonite or kaolin for example, in rubber compositions used for the manufacture of tires and, in particular, of treads, results in a reduction in the rolling resistance and an improvement in grip to wet, snow-covered or icy ground. However, it also results in an unacceptable decline in the wear resistance because these conventional white fillers do not have sufficient reinforcement ability with respect to such rubber compositions. For this reason, these white fillers are generally referred to as non- reinforcing fillers, or alternatively inert fillers.

One effective solution to this problem was described in Patent Application EP-A-0 501 227, which discloses a special diene rubber composition, reinforced with a highly dispersible precipitated silica. This composition makes it possible to manufacture a tire having substantially improved rolling resistance, without affecting the other properties, in particular those of grip, endurance and, above all, wear resistance.

Since the publication of EP-A-0 501 227, interest in silica-reinforced compositions has been very largely revived. However, silicas are generally more difficult to disperse than carbon blacks. Furthermore, compositions filled with silica, compared with those filled with carbon black, are known to have the disadvantage of (1) being more difficult to work (i.e. suitability for transformation or "processability") in the uncured state and (2) having a very high electrical resistance.

Fillers which are easier to disperse than silicas, such fillers being capable, of lowering the rolling resistance and improving the grip of the tires, like silicas, as well as providing a high level of reinforcement and, hence, of wear resistance, and also high electrical conductivity to the rubber compositions which they reinforce, are extremely desirable to tire manufacturers.

During the course of their, the Inventors have discovered a novel reinforcing filler, in this case a novel carbon black with modified surface (hereinafter referred to as "modified black" or "modified carbon black") which unexpectedly makes it possible to satisfy these different contradictory requirements.

SUMMARY OF THE INVENTION

The invention relates to a process for coating at least in part, a carbon black with an adhering layer of aluminum oxide and/or hydroxide, this process comprising:
 a) impregnating the carbon black with a colloidal suspension formed by hydrolysis of a solution of aluminum alkoxide in an alcoholic solvent;
 b) removing the alcoholic solvent by evaporation; and
 c) heat-treating the impregnated black so as to transform the aluminous layer present at its surface into an adhering layer of aluminum oxide and/or hydroxide.

The invention furthermore relates to any carbon black coated with an adhering layer of aluminum oxide and/or hydroxide, obtainable by the process of the invention.

One preferred embodiment of the invention relates to a modified carbon black of the type for reinforcing a tire, having the following characteristics:
 (i) it is coated at least in part with a layer of aluminum oxide and/or hydroxide;
 (ii) its specific BET surface area is between 30 and 400 $m^2/g$;
 (iii) its average particle size (by mass), $d_w$, is between 20 and 400 nm;
 (iv) its disagglomeration rate, $\alpha$, measured via an ultrasound disagglomeration test, at 10% power of a 600-watt ultrasonic probe, is greater than $1 \times 10^{-3}$ $\mu m^{-1}/s$.

This reinforcing modified black for a tire is obtained by carrying out the process of the invention on a tire-grade starting carbon black. As a result of its specific combination of characteristics, notably its particular surface properties, the modified black has excellent dispersibility in diene rubber compositions intended for the manufacture of tires, and high reinforcement ability. It offers such compositions not only improved hysteresis and grip properties, but also high electrical conductivity.

Another subject of the invention is the use of the modified carbon black, as reinforcing filler in a diene rubber composition which can be used for manufacturing tires, particularly for treads for tires having low rolling resistance.

Another subject of the invention is a process for reinforcing a diene rubber composition which can be used for the manufacture of tires, in which the modified black is incorporated into this composition by mixing in an internal mixer, before the introduction of the vulcanization system.

Carbon blacks having a modified surface and coated with a siliceous layer have been described in recent patent applications, in particular as reinforcing filler for rubber compositions for tires (see, for example, EP-A-0 711 805, EP-A-0 799 854, EP-A-0799 867 and WO96/37547). Generally, these novel fillers and their potential for use in tires are still little-known to tire manufacturers. Compared with these carbon blacks coated with a siliceous layer, the modified blacks of the invention have the significant advantage that their aluminous surface layers, formed of aluminum oxides and/or hydroxides, which are more stable and chemically more reactive than silicon oxides, will consequently adhere better to the particles of black and will be more reactive than a siliceous layer. Furthermore, compared with silica, even a highly dispersible silica, the modified black of the invention has the advantage of being more readily dispersible in the rubber compositions and providing the latter with easier working in the uncured state.

Patent Application WO97/42256 describes carbon blacks treated directly in the synthesis reactor for the carbon black with various metal compounds in the form of oxides, hydroxides or carbides of different metals (for example aluminum, zinc, magnesium, calcium, titanium, vanadium, cobalt, nickel, zirconiwn, tin, antimony, chromium, neodymium, lead, tellurium, barium, caesium, iron and molybdenum) as potential fillers for rubber compositions. The blacks thus treated at very high temperature in the synthesis reactor consist of hybrid aggregates or particles having two phases, formed by a thorough mixture of carbon black and metal compound, with the metal compound being located both in the interior and close to the surface of the aggregates. It is specified that the content of metal atom may form 50% or even 99% of the mass of the final aggregate (% by mass). It will be understood that such hybrid fillers, if they were in some way freed of their metal compound fraction, for example by suitable chemical treatment, would have neither the morphology nor the properties of a conventional carbon black, but those of high-porosity carbon-containing residues. The treated carbon blacks described in WO97/42256 must not be confused with carbon blacks coated solely with a layer of metal compound which, once such a coating had been eliminated, resume their initial structures.

BRIEF DESCRIPTION OF THE DRAWINGS

The invention and its advantages will be readily understood in light of the description and examples which follow and of the drawings of which.

DETAILED DESCRIPTION

I. Measurements and Tests Used

I-1. Characterization of the Reinforcing Fillers

Figure 1:
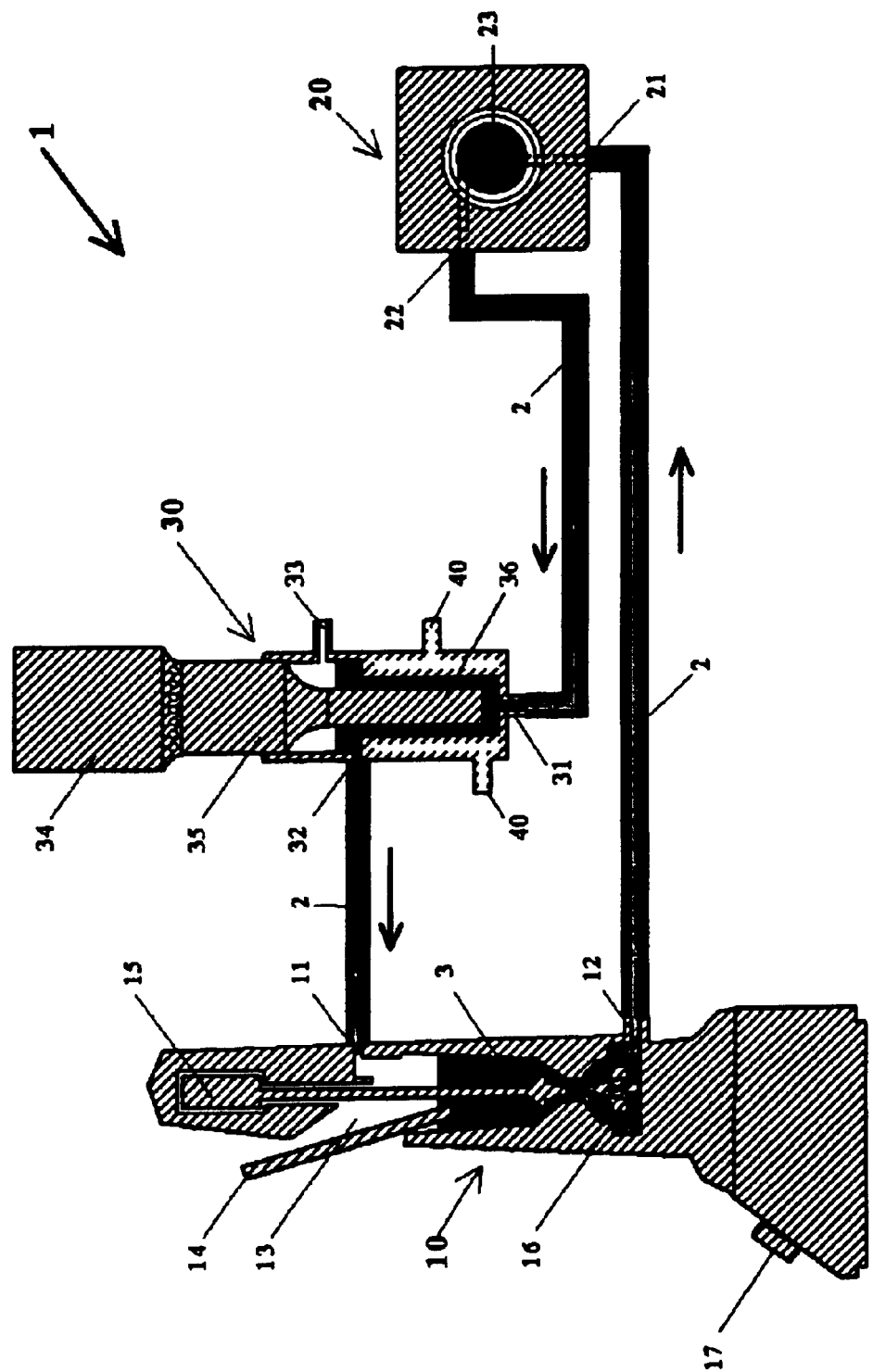
FIG. 1 is a diagram of a device suitable for measuring the ultrasound disagglomeration rate ($\alpha$) of a filler in the form of agglomerates of particles.

The reinforcing fillers used are characterized as indicated hereafter.

a) BET Specific Surface Area:

The BET specific surface area is determined in known manner, in accordance with the method of Brunauer, Emmet and Teller described in "*The Journal of the American Chemical Society*", vol. 60, page 309, February 1938, corresponding to Standard AFNOR-NF-T45-007 (November 1987).

b) Average Size of the Particles $d_w$:

The average size (by mass) of the particles, $d_w$, is measured after dispersion of the filler, by ultrasound disagglomeration, with the analysis being carried out in an aqueous solution containing 15% ethanol and 0.05% of a non-ionic surfactant (% by volume).

The term "particle" as used in the present application is understood to mean "aggregate", and not that of a possible elementary particle which may form part of this aggregate ("aggregate" is understood, in known manner, to mean a non-splittable unit of elementary particles, produced during synthesis of the filler).

The determination uses a centrifugal photosedimentometer type "DCP" ("Disk Centrifuge Photosedimentometer", sold by Brookhaven Instruments). A suspension of 10 mg of carbon black is first produced in 40 ml of an aqueous solution containing 15% ethanol and 0.05% of a non-ionic surfactant (% by volume), by action over 10 minutes at 60% power (or 60% of the maximum position of the "tip amplitude") of a 600-watt ultrasonic probe (a Vibracell one-half inch ultrasound generator sold by Bioblock). During ultrasound generation, a gradient composed of 15 ml water (with 0.05% of a non-ionic surfactant) and 1 ml ethanol is injected into the disc of the sedimentometer rotating at 8000 rpm in order to form a "step gradient". Then, 0.3 ml of the suspension of carbon black is injected at the surface of the gradient. After sedimentation for 120 minutes, the mass distribution of the particle sizes and the average size by mass $d_W$ ($d_w = S(n_i \ d_i^5)/S(n_i \ d_i^4)$) with $n_i$ being the number of objects of the size class $d_i$) are calculated by the software of the sedimentometer.

c) Disagglomeration Rate $\alpha$:

The disagglomeration rate, a, is measured in what is called the "ultrasound disagglomeration test", at 10% power of a 600-watt probe. This test makes it possible to continuously measure the evolution of the size of the agglomerates of particles during ultrasound generation, as indicated below.

The setup used is formed by a laser granulometer ("Mastersizer S", sold by Malvern Instruments—He—Ne red laser source, wavelength 632.8 nm) and its preparer ("Malvern Small Sample Unit MSX1"), between which there has been inserted a continuous-flow treatment cell (Bioblock M72410) provided with an ultrasonic probe (600-watt ½ inch ultrasound generator type Vibracell sold by Bioblock).

A small quantity (15 mg) of filler to be analysed is introduced into the preparer with 160 ml of an aqueous solution containing 20% by mass ethanol, with the rate of circulation being set to its maximum. At least three consecutive measurements are taken to determine the initial mean diameter (by volume) of the agglomerates, referred to as $d_v[O]$, in accordance with the known Fraunhofer calculation method (Malvern 3$$D calculation matrix). The ultrasound generation is then set at a power of 10% (or 10% of the maximum position of the "tip amplitude") and the evolution of the mean diameter in volume $d_v[t]$ as a function of the time "t" is monitored for about 8 minutes with one measurement approximately every 10 seconds. After an induction period of about 3 minutes, it was noted that the reciprocal of the mean diameter in volume $1/d_v[t]$ varies linearly with the time "t" (steady state conditions of disagglomeration). The disagglomeration rate $\alpha$ is calculated by linear regression of the curve of evolution of $1/d_v[t]$ as a function of the time "t", within the zone of steady state conditions of disagglomeration. It is expressed in $\mu m^{-1}/s$.

By way of example and as reference, the ultrasound disagglomeration test above, applied to a control silica well-known to the person skilled in the art for its very good dispersibility (silica sold by Rhône-Poulenc under the reference Zeosil 1165MP), results in a disagglomeration rate, $\alpha$, of approximately $1.5 \times 10^{-3} \ \mu m^{-1}/s$.

FIG. 1 shows an example of the setup of the measuring device which can be used for performing this ultrasound disagglomeration test. This device consists of a closed circuit 1 within which a flow 2 of agglomerates of particles suspended in a liquid 3 can circulate. This device comprises a sample preparer 10, a laser granulometer 20 and a treatment cell 30. A vent to atmospheric pressure (13, 33), at the level of the sample preparer 10 and of the treatment cell 30 itself, permits continuous elimination of the air bubbles which form during ultrasound generation (i.e. the action of the ultrasonic probe).

The sample preparer 10 ("Malvern Small Sample Unit MSX1") is intended to receive the sample of filler to be tested (as it is, or already in suspension in the liquid 3) and to send it through the circuit 1 at a controlled speed (potentiometer 17), in the form of a flow 2 of liquid suspension. This preparer 10 is simply a receiving tank which contains, and through which circulates, the suspension to be analysed. It is equipped with a stirrer motor 15, of variable speed, in order to prevent sedimentation of the agglomerates of particles of the suspension. A centrifuigal mini-pump 16 is intended to circulate the suspension 2 in the circuit 1. The entrance 11 to the preparer 10 is connected to the open air by an opening 13 intended to receive the sample of filler to be tested and/or the liquid 3 used for the suspension.

A laser granulometer 20 ("Mastersizer S"), is connected to the preparer 10, the role of which is to measure continuously, at regular time intervals, the average size "$d_v$" of the agglomerates as the flow 2 passes, by means of a measuring cell 23 to which are coupled the automatic recording and calculation means of the granulometer 20. It should be recalled here briefly that laser granulometers utilize, in known manner, the principle of diffraction of light by solid objects suspended in a medium, the refractive index of which differs from that of the solid. According to the theory of Fraunhofer, there is a relationship between the size of the object and the angle of diffraction of light (the smaller the object, the greater the angle of diffraction). In practice, it is sufficient to measure the amount of light diffracted for different angles of diffraction to be able to determine the size distribution (by volume) of the sample, $d_v$ corresponding to the mean of this distribution ($d_v = S(n_i \ d_i^4)/S(n_i \ d_i^3)$ with $n_i$=number of objects of the size class $d_i$).

Finally, treatment cell 30 equipped with an ultrasonic probe 35 (converter 34 and probe head 36) intended continuously to break up the agglomerates of particles as the flow 2 passes is inserted between the preparer 10 and the laser granulometer 20.

It is preferred that the treatment cell 30 be arranged between the outlet 22 of the granulometer 20 and the inlet 11 to the preparer 10, such that, during operation, the flow 2 of particles emerging from the preparer 10 first passes through the laser granulometer 20, before entering the treatment cell 30. This arrangement has two major advantages for measurements: first, the air bubbles due to the action of the ultrasonic probe are eliminated on passing through the preparer 10 (which is in the open air), i.e., before entering the granulometer 20; and, therefore, do not upset the laser diffraction measurement; and second, the homogeneity of the suspension is improved by first passing through the preparer 10.

The treatment cell 30 is preferably arranged such that the flow 2 of particles which penetrates therein via an inlet 31, first passes in front of the head 36 of the ultrasonic probe 35. This non-conventional arrangement wherein the flow 2 enters through the bottom 31 of the cell, and not through the top 32 has the following advantages: first, the entire circulating suspension 2 is forced to pass in front of the end 36 of the ultrasonic probe 35, which is the most active zone in terms of disagglomeration; and second, this arrangement permits initial degasification after ultrasound generation within the body of the treatment cell 30 itself, the surface of the suspension 2 then being in contact with the atmosphere by means of a tube 33 of small diameter.

The flow 2 is preferably thermostatically controlled by means of a cooling circuit 40 arranged, at the level of the cell 30, in a double casing surrounding the probe 35, with the temperature being controlled, for example, by a heat sensor 14 immersed in the liquid 3 at the level of the preparer 10.

The arrangement of the various elements of the measuring device is optimized so as to restrict as far as possible the circulating volume, that is to say, the length of the connecting tubes (for example, flexible tubes).

I-2. Characterization of the Rubber Compositions

The rubber compositions are characterized, before and after curing, as indicated below.

a) Mooney Plasticity:

An oscillating consistometer such as described in standard AFNOR-NF-T43-005 (November 1980) is used. The Mooney plasticity is measured in accordance with the following principle: the uncured mix is molded in a cylindrical enclosure heated to 100° C. After preheating for one minute, the rotor turns within the test piece at 2 rpm, and the torque used for maintaining this movement is measured after four minutes' rotation. The Mooney plasticity (ML 1+4) is expressed in "Mooney units" (MU).

b) Tensile Tests:

These tests make it possible to determine the elasticity stresses and the breaking properties. Unless indicated otherwise, they are carried out in accordance with the standard AFNOR-NF-T46-002 of September 1988.

The secant moduli at 10% elongation (M10), 100% elongation (M100) and 300% elongation (M300) are measured in a second elongation (i.e. after an accommodation cycle), calculated reduced to the real section of the test piece. All these tensile measurements are carried out under normal conditions of temperature and humidity in accordance with the standard AFNOR-NF-T40-101 (December 1979).

c) Hysteresis Losses:

The hysteresis losses (HL) are measured by rebound at 60° C. at the sixth impact, and are expressed in % in accordance with the following equation: HL (%)=100[($W_0-W_1)/W_0$], where $W_0$: energy supplied; $W_1$: energy restored.

d) Dynamic Properties:

The dynamic properties, referred to as $\Delta G^*$ and tan$(\delta)_{max}$, measured as a function of the deformation, are carried out at 10 Hertz with a peak-to-peak deformation of 0.15% to 50%. The non-linearity $\Delta G^*$ is the difference in the shear modulus between 0.15% and 50% deformation, expressed in MPa. The hysteresis is expressed by the measurement of tan$(\delta)_{max}$ which corresponds to the maximum of tan$(\delta)$.

II. Conditions of Carrying out the Invention

II-1. Synthesis and Properties of the Modified Black

The process of the invention, for coating at least in part, a carbon black with an adhering layer of aluminum oxide and/or hydroxide, comprises:

a) impregnating the carbon black with a colloidal suspension formed by a hydrolysis of a solution of aluminum alkoxide in an alcoholic solvent;

b) removing the alcoholic solvent by evaporation; and c) heat-treating the black thus impregnated so as to transform the aluminous layer present at its surface into an adhering layer of aluminum oxide and/or hydroxide.

Any carbon blacks are suitable as the starting carbon black.

"Aluminum oxide and/or hydroxide" means an aluminum compound corresponding, with the exception of any impurities and the water of hydration, to the general Formula (I) below (a and b being real numbers):

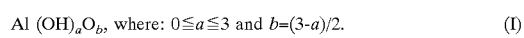

Such compounds include pure aluminum oxides or aluminas $Al_2O_3$ (a=0), aluminum tri-hydroxides $Al(OH)_3$ (a=3), intermediate oxide/hydroxides (0<a<3) and the possible hydrated forms thereof, or a mixture of such trihydroxides and/or oxide-hydroxides. This formula is given with the exception of any impurities. It should be understood that the aluminum oxides and/or hydroxides present on the surface of the modified carbon black may comprise a certain proportion of impurities resulting from the process used for manufacturing the filler.

"Colloidal suspension" is understood to mean a suspension of solid phase in a liquid, where the size of solids is less than a micrometer (Mm). To form the impregnating colloidal suspension, an aluminum alkoxide is dissolved, with stirring and heating, in a selected alcohol.

The alcoholic solvent may be methanol, ethanol, (iso) propanol, the various isomers of butanol, or a mixture of two or more of these compounds. The aluminum alkoxide used is an aluminum alkoxide comprising 1 to 6 carbon atoms, aluminum methoxide, ethoxide, (iso)propoxide and butoxides, or a mixture of two or more of these compounds.

The impregnation stage may be performed at ambient temperature (20° C.) or at a higher temperature, for example between 30° C. and 65° C., depending on the nature of the alcohol or alcohols used. The temperature should be lower than the boiling temperature of the suspension. However, the selected temperature may be close to this boiling temperature. The impregnation time, from several minutes to several hours, is selected to be sufficiently long, enough to create sufficient physical-chemical interactions between the surface of the carbon black and the aluminium-based compound.

Preferably, the impregnating colloidal suspension comprises nitric acid which is used both as a hydrolysis catalyst for the alkoxide solution and as peptizing agent-for the colloidal suspension. After reaction, the nitric acid is removed by washing the impregnated black with water. The elimination of the alcoholic solvent, after impregnation of the carbon black, is carried out by any appropriate means, for example by vacuum evacuation, with stirring.

The treatment stage is preferably a heat treatment carried out under inert gas, for example argon, at a temperature preferably between 100° C. and 900° C., and more preferably between 150° C. and 850° C. Generally, the higher the temperature, the more the compound of Formula (I) "shifts" from hydroxide towards oxide (reduction of a and increase in b). For example, treatment at a temperature of 800–850° C., results in an aluminous layer that is essentially alumina ($Al_2O_3$).

The person skilled in the art will be able to adjust the different parameters of the process above according to the particular working conditions of the invention, in light of the description and the examples which follow.

Preferably the amount of aluminum (of the element Al) present on the surface of the modified carbon black thus obtained is greater than 0.25% (% by weight of modified black, determined by chemical analysis), and more preferably greater than 0.5%. Advantageously, the amount of aluminum is between 0.5% and 5%.

As a result of its adhering aluinum oxide and/or hydroxide layer, the modified black of the invention can be used in numerous applications, for example as a pigment in inks, paints, minerals or plastics articles. The increase in its surface polarity, due to the presence of aluminum oxide and/or hydroxide, promotes better interaction between the black and its matrix.

However, according to a preferred embodiment of the invention, the modified carbon black of the invention is a carbon black of the reinforcing type for tires as described hereafter.

II-2. Modified Black for a Tire

According to a preferred embodiment of the invention, the modified carbon black of the invention comprises a carbon black of the reinforcing type for tires. This is understood to mean a carbon black which can be used for reinforcing diene rubber compositions intended for the manufacture of tires.

The modified black for tires has the following characteristics:

(i) it is coated at least in part with by a layer of aluminum oxide and/or hydroxide;

(ii) its specific BET surface area is between 30 and 400 $m^2/g$;

(iii) its average particle size (by mass), $d_w$, is between 20 and 400 nm;

(iv) its disagglomeration rate, $\alpha$, measured via the ultrasound disagglomeration test, at 10% power of a 600-watt ultrasonic probe, is greater than $1 \times 10^{-3}$ $\mu m^{-1}/s$.

Where the BET surface area is less than 30 $m^2/g$, the rubber compositions have easier working (suitability for transformation or "processability") and a reduced hysteresis, but exhibit a decline in the breaking and wear resistance properties in the tire comprising such fillers; where the BET surface areas are greater than 400 $m^2/g$, working in the uncured state becomes more difficult (higher Mooney plasticity) and the dispersion of the filler is adversely affected as a result. For excessively large sizes where $d_w$, is greater than 400 nm, the particles act like defects which localize stresses and are harmful in terms of wear, where sizes $d_w$ are too small, i.e., less than 20 nm, on the other hand, working in the uncured state and the dispersion of the filler during this working are impaired.

For all the reasons set forth above, the BET surface area preferably ranges from 50 to 300 $m^2/g$ and the particle size $d_w$ preferably ranges from 30 to 200 nm.

It is generally known that in order to obtain the optimum reinforcement properties imparted by a filler, it is advantageous in particular for filler to be present in the rubber matrix in a final form which is both as finely divided as possible and is distributed as homogenously as possible. Currently, such conditions may be obtained only if the filler (1) has a very good ability to be incorporated into the matrix during mixing with the elastomer and (2) disagglomerates in order to disperse homogenously in the elastomer.

The intrinsic dispersibility of a filler can be evaluated via the ultrasound disagglomeration test described in Section I above, by measuring its disagglomeration rate $\alpha$.

It has been found that, for a rate a greater than $1 \times 10^{-3}$ $\mu m^{-1}/s$, the modified black has good dispersibility, i.e., that few micronic agglomerates are observed by reflection in optical microscopy on a section of rubber composition prepared according to known techniques.

For even better dispersion of the modified black in the diene rubber matrix, which provides for optimum reinforcement, it is preferred that the disagglomeration rate $\alpha$ be greater than $1.5 \times 10^{-3}$ $\mu m^{-1}/s$. This is particularly advantageous when the invention is used for manufacturing treads having a low rolling resistance.

Because of its aluminous surface layer, the modified carbon black, has high surface reactivity, i.e. a high amount of surface functions (Al—OH) which are reactive to the coupling agent (filler/elastomer). This is particularly beneficial to the mechanical properties of the rubber compositions of the invention, i.e., to the reinforcement function performed by the filler.

Preferably the amount of aluminium (of the element Al) present on the surface of the modified carbon black is greater than 0.25%, more preferably greater than 0.5%, and even more preferably ranges between 0.5% and 5% (% by weight of modified black, determined by chemical analysis).

Below the minima indicated, the effect of lowering the hysteresis may be inadequate, depending on the nature of the compositions used, particularly the elastomer. Beyond the maximum amount advocated generally no further improvement in the hysteresis is observed, whereas there is a risk of (1) poor dispersibility of the modified black, a known disadvantage of white fillers relative to the carbon black, and (2) a reduction of the adhesion of the aluminous layer to the surface of the carbon black. An amount of more than 5% aluminum also requires larger quantities of precursor product (aluminium alkoxide) and even longer impregnation times during manufacture, which is economically less advantageous.

To optimize the adhesion of the aluminous layer to the surface of the black and the dispersibility of the filler in the rubber composition, particularly when the composition is intended for a tread for a tire having low rolling resistance, it is preferred that the amount of aluminium be between 0.5% and 3%.

As a result of combined specific characteristics, the modified black of the invention has novel, unexpected properties in terms of dispersibility and reinforcement ability. Compared with conventional carbon blacks, it offers the rubber compositions improved properties of hysteresis and grip similar to those which can be obtained with reinforcing white fillers, such as siliceous fillers. Furthermore, it provides these compositions significantly better electrical conductivity than with white fillers, such as silica—close to that offered by conventional carbon blacks. In all cases the modified carbon black provides for sufficient dissipation of electrostatic charges which may form by friction, in particular during travel of the tires.

Suitable carbon blacks to use as the starting material include all the reinforcing carbon blacks conventionally used in tires, in particular in treads for these tires. Particular blacks include HAF ("High Abrasion Furnace"), ISAF ("Intermediate Super Abrasion Furnace") and SAF ("Super Abrasion Furnace"). Of the latter, reference will more particularly be made to the reinforcing carbon blacks of series 100,200 or 300 (ASTM grades).

Preferably, the carbon blacks have the following characteristics:

a BET surface area of between 20 and 200 $m^2/g$, and more preferably between 50 and 170 $m^2/g$;

an average particle size (by mass), $d_w$, of between 20 and 400 nm, and more preferably between 30 and 200 nm.

Non-limiting examples of preferred starting blacks, include the blacks N115, N134, N234, N339, N347 and N375.

III. Examples of Embodiment of the Invention
III-1. Synthesis of the Modified Black The synthesis of the modified black was carried out according to paragraph II-2 of Section II above, using the specific conditions below.

a) Preparation of the Impregnation Solution:

8.0 g of aluminium isopropoxide (98% Al(OCH(CH$_3$)$_2$)$_3$, Sigma Chemicals) were dissolved in 200 ml of anhydrous ethanol by magnetic stirring at 500 rpm at a temperature of 60° C. After one hour, 42.4 g of demineralized water was added and stirring was continued at 60° C. Two hours later, 10 ml of concentrated nitric acid (53%) were added and the temperature was gradually lowered to ambient temperature, followed by stirring for 12 hours. Thus, a colloidal suspension was obtained by hydrolysis of the alcoholic solution of aluminium isopropoxide.

b) Impregnation of the Carbon Black:

A black of the type N234 (tire grade) was used as starting carbon black. 40 g of carbon black N234 were placed in the flask of a rotary evaporator (Rotavapor R-124 of Büichi, sold by Bioblock). The bath temperature was set at 50° C. and the speed of rotation at 80 rpm (time "t"=0). After stirring for 55 minutes (t=55 min), a third of the impregnation solution was added, another third was added at t=85 minutes, and the last third was added at t=115 minutes. Thus, the stirring was maintained for approximately three hours. A vacuum was then created (t=5 hours) to remove the excess alcoholic solvent. After 30 minutes, the temperature of the bath was set to 60° C. and stirring was thus continued under vacuum until t=7 hours, to completely evacuate the solvent. The carbon black thus impregnated is then removed from the flask, placed in a vacuum oven (200 mm Hg) and dried at 100° C. for one night. The black thus treated was then extracted by water over 48 hours in a Soxhlet apparatus, then dried again under the same conditions.

c) Heat Treatment:

The impregnated carbon black was then placed in a tubular oven (Carbolite CTF15/75 610, sold by Osi), under a flow of argon (200 ml/min), then subjected to the following thermal cycle: 30 minutes at 200° C., followed by 1 hour at 800° C. The temperature increase ramps were set at 10° C./minute.

The characteristics of the carbon black thus obtained are summarized in Table 1. It should be noted that the particle size $d_w$ is not significantly different from the starting black, but that its BET surface area is greatly increased, i.e., by more than 50%. The amount of aluminium is high, about 1.5%, a result which is well-correlated with the amount of ash measured.

Furthermore, the disagglomeration rate is distinctly greater than the set lower limit of $1\times10^{31\ 3}\ \mu m^{-1}/s$ (i.e. 2/3 of $a_o$). A rate $\alpha$ of $3.1\times10^{-3}\ \mu m^1/s$ must be considered as particularly high, since it is greater by about 100% than the rate a recorded for a highly dispersible control silica (Zeosil 1165MP).

Figure 2:
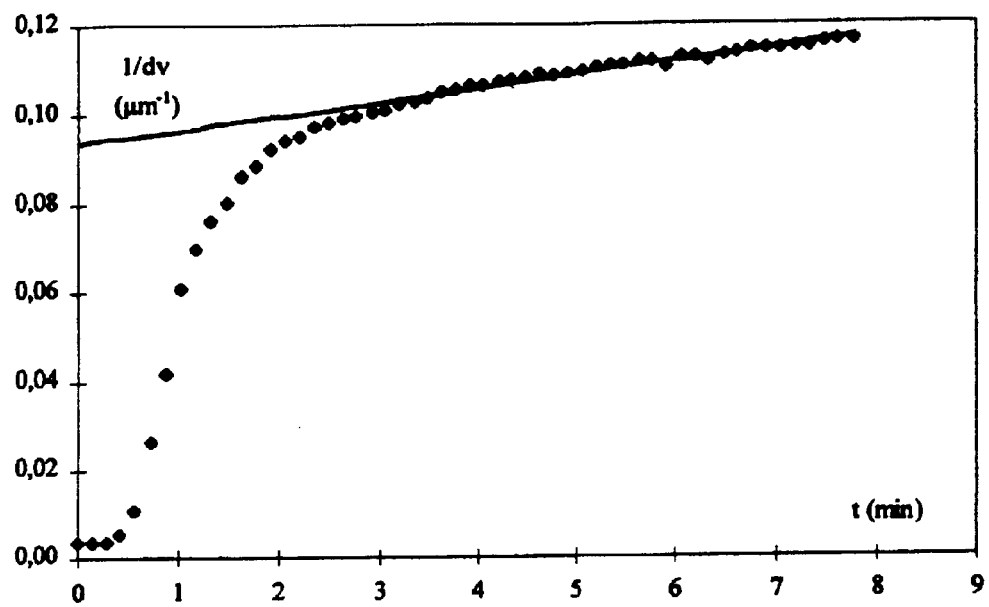
FIGS. 2 and 3 depict curves of the change in the size of the agglomerates during ultrasound generation using the device of FIG. 1, for fillers whether or not in accordance with the invention, from which curves the disagglomeration rates a are determined.
Figure 3:
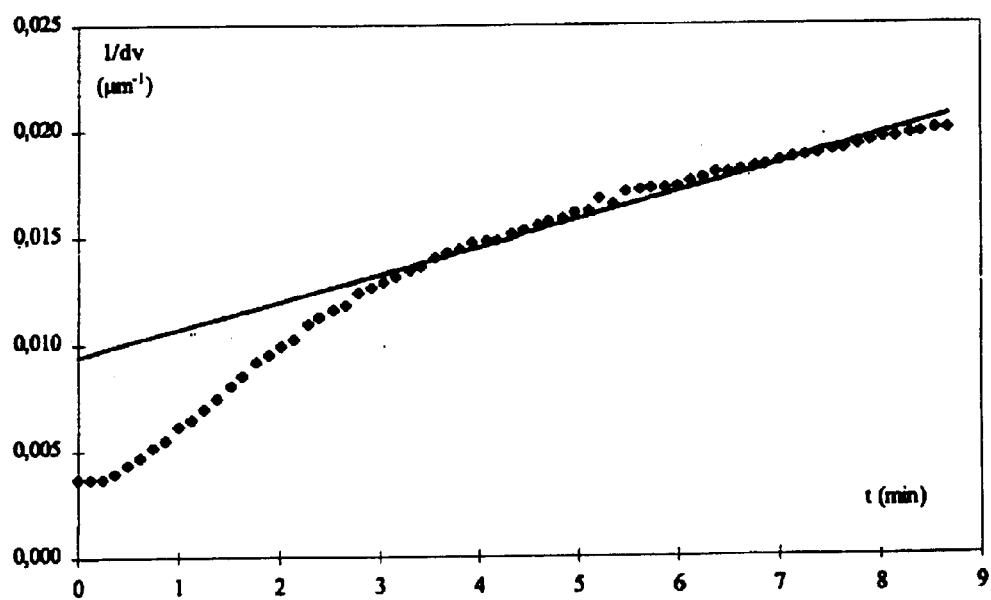

FIGS. 2 and 3 show the curves of evolution $[1/d_v(t)=f(t)]$ of the size of the agglomerates, recorded in the ultrasound disagglomeration test, respectively for the modified black and for the highly dispersible control silica (Zeosil 1165MP), where the rate $\alpha$ is determined from the slope of the straight line $[1/d_v(t)=f(t)]$.

It can be seen from FIGS. 2 and 3 that the first points recorded ("t" varying from 0 to about 30 s) correspond to the measurement of the initial diameter $d_v[O]$, followed (after actuation of the ultrasonic probe) by progressive passage ("t" from 30 s to about 3 min) to steady state conditions of disagglomeration during which the reciprocal of "$d_v$" varies linearly with the time "t". The recording of the data was stopped after about 8 minutes. The disagglomeration rate $\alpha$ in the zone of steady state conditions of disagglomeration was deduced from this by elementary calculation of linear regression, performed by the calculator of the granulometer.

The starting carbon black N234, in the same ultrasound disagglomeration test, has a particularly high rate a ($17\times10^{-3}\ \mu m^{-1}/s$; not shown in the drawings), which was expected, given the known very high dispersibility of the carbon blacks for tires.

III-2. Tests on Rubber Compositions

Two diene rubber compositions intended for the manufacture of tires or treads for tires were compared. The SBR elastomer (styrene-butadiene copolymer), prepared in solution, comprises 25% styrene, 58% 1-2-polybutadiene units and 23% polybutadiene trans-1,4 units.

The compositions were prepared in known manner as follows: The diene elastomer was introduced into an internal mixer filled to 75%, the temperature of which is approximately 70° C. After an appropriate kneading time, for example of the order of 1 minute, all the other ingredients were added except for the vulcanization system. Thermo-mechanical working was then carried out for about 5.5 minutes, at an average paddle speed of 70 rpm until a dropping temperature of about 140° C. was reached. The mixture thus obtained was recovered, and the vulcanization system was added on an external mixer (homo-finisher) at 30° C. Vulcanization was carried out at 150° C. for 40 min.

The 2 compositions tested are generally identical apart from the following differences in fillers:

composition No. 1: conventional reinforcing filler formed by the untreated carbon black N234 (control);

composition No. 2: reinforcing filler formed exclusively by the modified carbon black N234 in accordance with the invention, with which there is associated a coupling agent to link the aluminous layer present at its surface and the elastomer.

The coupling agent used was a bis(3-triethoxysilylpropyl) tetrasulphide, having the formula $[(C_2H_5O)_3Si(CH_2)_3S_2]_2$, which is sold by Degussa under the name Si69. It was introduced at a rate corresponding to surface covering of about $9.6 \times 10^{-7}$ mole/m² of modified carbon black.

Tables 2 and 3 show in succession the formulation of the different compositions (Table 2—amount of the different products expressed in phr, i.e., parts per 100 parts by weight of elastomer), and their properties before and after curing at 150° C. for 40 minutes (Table 3).

The following observations may be made:

The Mooney plasticity value appears slightly lower for composition No. 2 comprising the modified black than for the control composition No. 1, which reveals a very good ability of composition No. 2 to be worked in the uncured state.

Composition No. 2 has moduli values, in particular values of moduli M100 and M300, indicating the quality of reinforcement, which are at least equal to, if not greater, than those obtained on the control composition No. 1.

Composition No. 2 furthermore has very advantageous hysteretic properties, compared with those observed for the composition filled with conventional carbon black, with a very substantial decrease in the rebound losses (HL), in the non-linearity ΔG* and in $\tan(\delta)_{max}$.

Thus, unexpectedly, the use of the modified black for tires makes it possible very to substantially improve the hysteresis properties without adversely affecting the properties of working in the uncured state or of reinforcement after curing. These results make it possible to predict both good ability to resist wear and particularly low rolling resistance for tire treads, while guaranteeing these treads satisfactory electrical conductivity.

It is believed that the specific process of the invention (impregnation in the cold state followed by heat treatment) makes it possible to deposit on the surface of the particles or aggregates of carbon black a fine aluminous layer which is stable, adheres strongly and is distributed relatively homogenously (average particle size little altered, but great increase in the BET surface area). Such a quality of coating combined with the other characteristics of the modified black of the invention, might explain the improved performance of the latter in rubber compositions for tires, both relative to a conventional carbon black (lowering of hysteresis) and to a precipitated silica, even a highly dispersible one (increase in dispersibility; increased electrical conductivity).

The modified blacks of the invention thus offer an advantageous alternative to the use of conventional carbon blacks, highly dispersible silicas, and even carbon blacks coated with a siliceous layer.

TABLE 1

|  | N234 | Modified N234 |
|---|---|---|
| Ashes 825° C./air (%) | 0.06 | 3.24 |
| Amount of Al (%) | 0.03 | 1.49 |
| He Density (g/ml) | 1.9926 | 2.0329 |
| BET surface area (m²/g) | 117 | 193 |
| $d_w$ (nm) | 65 | 68 |
| α (μm⁻¹/s) | 0.0174 | 0.0031 |

TABLE 2

|  | Composition number | |
|---|---|---|
|  | 1 | 2 |
| SBR (1) | 100 | 100 |
| N234 | 50 | — |
| Modified N234 | — | 50 |
| Si69 | — | 5 |
| ZnO | 3 | 3 |
| Stearic acid | 1.5 | 1.5 |
| Antioxidant (2) | 1 | 1 |
| DPG (3) | 0.5 | 0.5 |
| Sulphur | 1.5 | 1.5 |
| CBS (4) | 2 | 2 |

(1) butadiene-styrene copolymer
(2) N-1,3-dimethylbutyl-N-phenylparaphenylenediamine
(3) Diphenylguanidine
(4) N-cyclohexyl-2-benzothiazylsulphenamide

TABLE 3

|  | Composition number | |
|---|---|---|
|  | 1 | 2 |
| Plasticity (MU) | 106 | 101 |
| M10 (MPa) | 6.41 | 6.27 |
| M100 (MPa) | 5.32 | 5.68 |
| M300 (MPa) | 14.09 | 14.25 |
| HL (%) | 31.6 | 28.1 |
| ΔG* (MPa) | 4.81 | 3.20 |
| $\tan(\delta)_{max}$ | 0.345 | 0.291 |

What is claimed is:

1. A carbon black, characterized by:
   (i) being coated at least in part by a layer of aluminum oxide and/or hydroxide;
   (ii) having a specific BET surface area of between 30 and 400 m²/g;
   (iii) having an average particle size (by mass), $d_w$, of between 20 and 400 nm; and
   (iv) having an ultrasound disagglomeration rate, α, greater than $1 \times 10^{-3}$ μm⁻¹/s.

2. The carbon black of claim 1, wherein the disagglomeration rate α is greater than $1.5 \times 10^{-3}$ μm⁻¹/s.

3. The carbon black of claims 1 or 2, wherein the black has an amount of surface aluminum greater than 0.5% (% by mass).

4. The carbon black of claim 3, wherein the amount of surface aluminum is between 0.5% and 5%.

5. The carbon black of claim 4, wherein the amount of surface aluminum is between 0.5% and 3%.

6. A process for producing the carbon black of claim 1, comprising
   a) impregnating a starting tire-grade carbon black with a colloidal suspension formed by hydrolysis of a solution of aluminum alkoxide in an alcoholic solvent;
   b) removing the alcoholic solvent by evaporation; and
   c) heat-treating the black thus impregnated so as to transform the aluminous layer present at its surface into an adhering layer of aluminum oxide and/or hydroxide.

7. The process of claim 6, wherein the starting carbon black is a reinforcing carbon black selected from the series 100, 200 or 300 (ASTM grades).

8. The process of claim 6, wherein the aluminum alkoxide is an alkoxide comprising 1 to 6 carbon atoms.

9. The process of claim 8, wherein the aluminum alkoxide is selected from the group consisting of aluminum methoxide, aluminum ethoxide, aluminum (iso)propoxide, aluminum butoxides and mixtures thereof.

10. The process of claim 6, wherein the alcoholic solvent is selected from the group consisting of methanol, ethanol, (iso)propanol, the various isomers of butanol, and mixtures thereof.

11. The process of claim 6, wherein the colloidal suspension comprises nitric acid.

12. The process of claim 6, wherein the heat treating is carried out at a temperature of between 100 and 900° C.

13. A process for reinforcing a diene rubber composition, comprising incorporating into the composition a carbon black of claim 1.

14. The process of claim 13, wherein the carbon black is incorporated in the composition by mixing in an internal mixer.

15. The process of claim 13 further comprising subsequently curing the composition by vulcanization.

* * * * *